United States Patent
Smith

(10) Patent No.: US 12,426,529 B2
(45) Date of Patent: Sep. 30, 2025

(54) GRASS SEEDING ASSEMBLY

(71) Applicant: Russell Smith, Virginia Beach, VA (US)

(72) Inventor: Russell Smith, Virginia Beach, VA (US)

( * ) Notice: Subject to any disclaimer, the term of this patent is extended or adjusted under 35 U.S.C. 154(b) by 809 days.

(21) Appl. No.: 17/714,779

(22) Filed: Apr. 6, 2022

(65) Prior Publication Data

US 2022/0361395 A1 Nov. 17, 2022

Related U.S. Application Data

(60) Provisional application No. 63/188,063, filed on May 13, 2021.

(51) Int. Cl.
*A01C 5/02* (2006.01)
*A01C 21/00* (2006.01)

(52) U.S. Cl.
CPC .............. *A01C 5/02* (2013.01); *A01C 21/002* (2013.01)

(58) Field of Classification Search
CPC ........ A01C 5/02; A01C 21/002; A01C 21/005
See application file for complete search history.

(56) References Cited

U.S. PATENT DOCUMENTS

| | | | | |
|---|---|---|---|---|
| 125,306 | A * | 4/1872 | Kent | A01C 5/02 111/96 |
| 127,150 | A * | 5/1872 | Cook | A01G 23/046 294/50.5 |
| 565,745 | A * | 8/1896 | Harris | A01G 23/046 294/50.5 |
| 3,517,629 | A * | 6/1970 | Bridges et al. | A01C 5/02 47/77 |
| 3,534,994 | A * | 10/1970 | Sterk | A01C 5/02 172/19 |
| 3,550,318 | A * | 12/1970 | Remke et al. | A01G 23/04 47/76 |
| 5,431,392 | A | 7/1995 | Carson | |
| 8,683,742 | B1 | 4/2014 | Cox | |
| 9,930,827 | B2 | 4/2018 | Camacho | |
| 11,032,968 | B2 | 6/2021 | Kraus | |
| 2011/0086730 | A1 | 4/2011 | Witts | |
| 2019/0021236 | A1 | 1/2019 | Patrick | |

FOREIGN PATENT DOCUMENTS

CA 2925775 10/2016

* cited by examiner

*Primary Examiner* — Tara Mayo

(57) ABSTRACT

A grass seeding assembly for reseeding a lawn with grass seed includes an insertion tool that has a handle and a cup disposed on the handle. A cone is engaged with the cup on the insertion tool for driving the cone into ground. The cone is foraminous to facilitate water to pass through the cone. A planting mixture is placed within the cone and the planting mixture comprises a chemical fertilizer, grass seed and soil. A mesh screen is wrapped around the cone such that the mesh screen inhibits the planting mixture from passing through the cone.

5 Claims, 6 Drawing Sheets

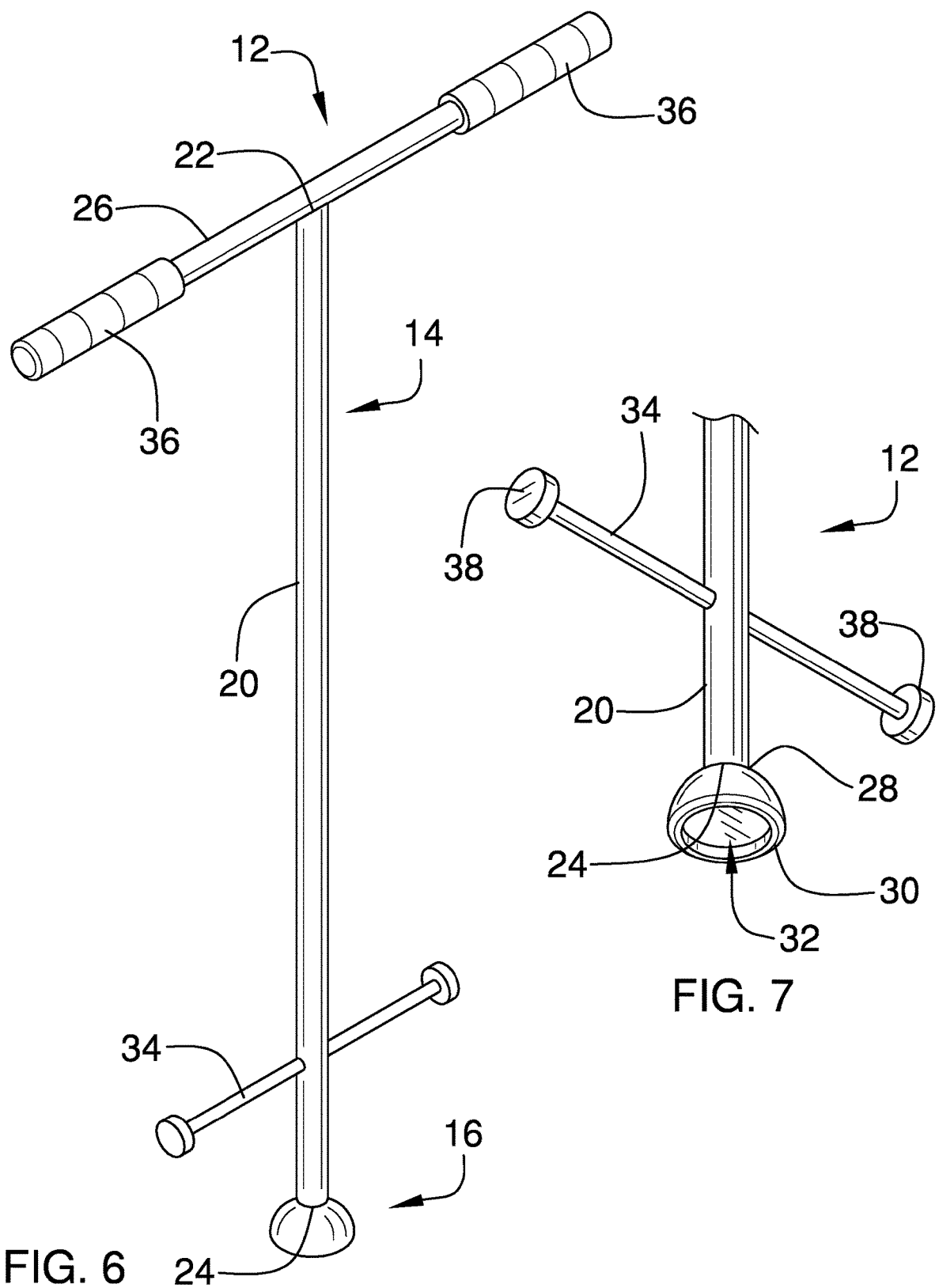

GRASS SEEDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to seeding devices and more particularly pertains to a new seeding device for reseeding a lawn with grass seed. The device includes a foraminous cone which is filled with a mixture of grass seed, fertilizer and soil and an insertion tool that includes a handle and a cup that engages the cone for driving the cone into the ground. The device includes a mesh screen that is positioned around the cone to inhibit the mixture of grass seed, fertilizer and soil from passing through the cone.

(2) Description of Related Art Including Information Disclosed Under 37 CFR 1.97 and 1.98

The prior art relates to seeding devices including an organic golf tee that will decompose after a pre-determined duration of time. The prior art discloses an agricultural device that includes a seed, a biodegradable container partially surround the seed and a fertilizer. The prior art discloses an aerial reseeding device that includes a flight capsule which can be dropped from an aircraft and a conic seed capsule disposed within the flight capsule. The prior art discloses a seed capsule that contains a seed and a germination catalyst which has a specific gravity being greater than that of water. The prior art discloses a biodegradable golf tee which has grass seed integrated therein. The prior art discloses an aerial seeding device that includes a capsule, filled with grass seed, which has a conic end and a rounded end for enhancing aerodynamics of the capsule.

BRIEF SUMMARY OF THE INVENTION

An embodiment of the disclosure meets the needs presented above by generally comprising an insertion tool that has a handle and a cup disposed on the handle. A cone is engaged with the cup on the insertion tool for driving the cone into ground. The cone is foraminous to facilitate water to pass through the cone. A planting mixture is placed within the cone and the planting mixture comprises a chemical fertilizer, grass seed and soil. A mesh screen is wrapped around the cone such that the mesh screen inhibits the planting mixture from passing through the cone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a perspective view of an insertion tool of an embodiment of the disclosure.

FIG. 7 is a bottom perspective view of an insertion tool of an embodiment of the disclosure.

DETAILED DESCRIPTION OF THE INVENTION

Figure 1:
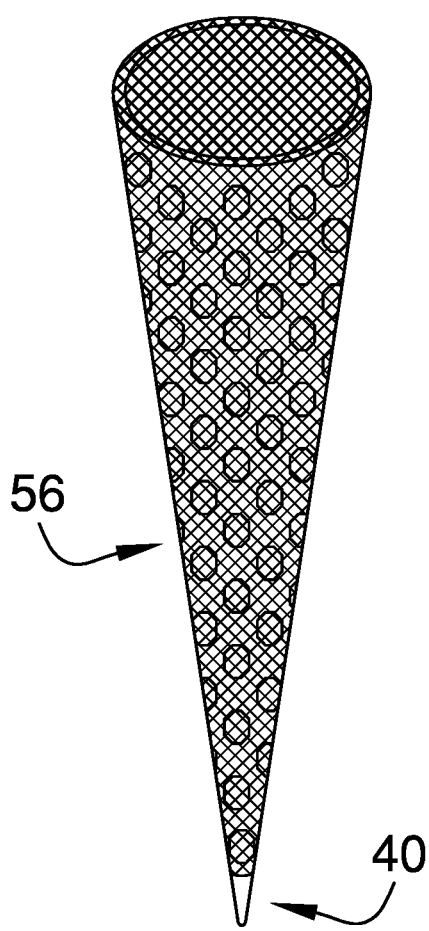
FIG. 1 is a perspective view of a cone and a mesh screen of an embodiment of the disclosure.
Figure 3:
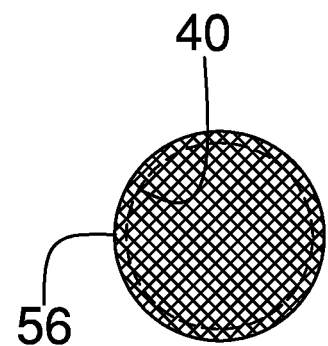
FIG. 3 is a top view of a cone and a mesh screen of an embodiment of the disclosure.
Figure 2:
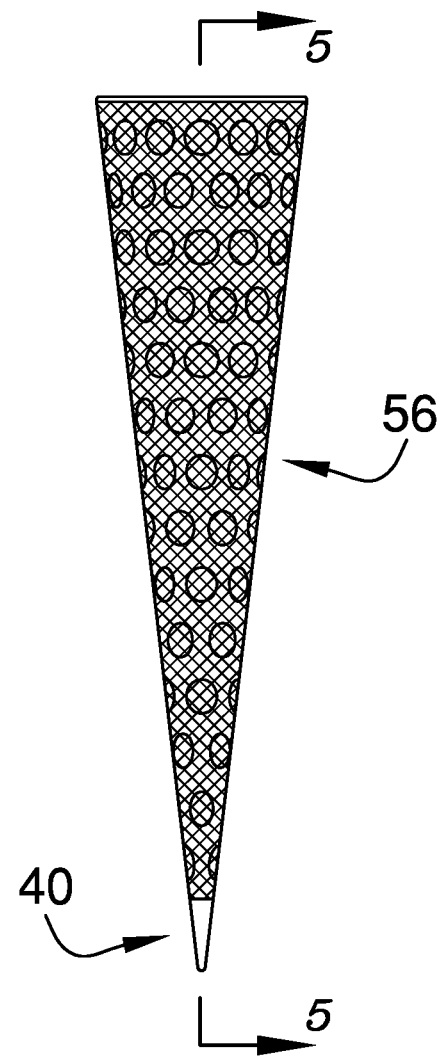
FIG. 2 is a front view of a cone and a mesh screen of an embodiment of the disclosure.
Figure 4:
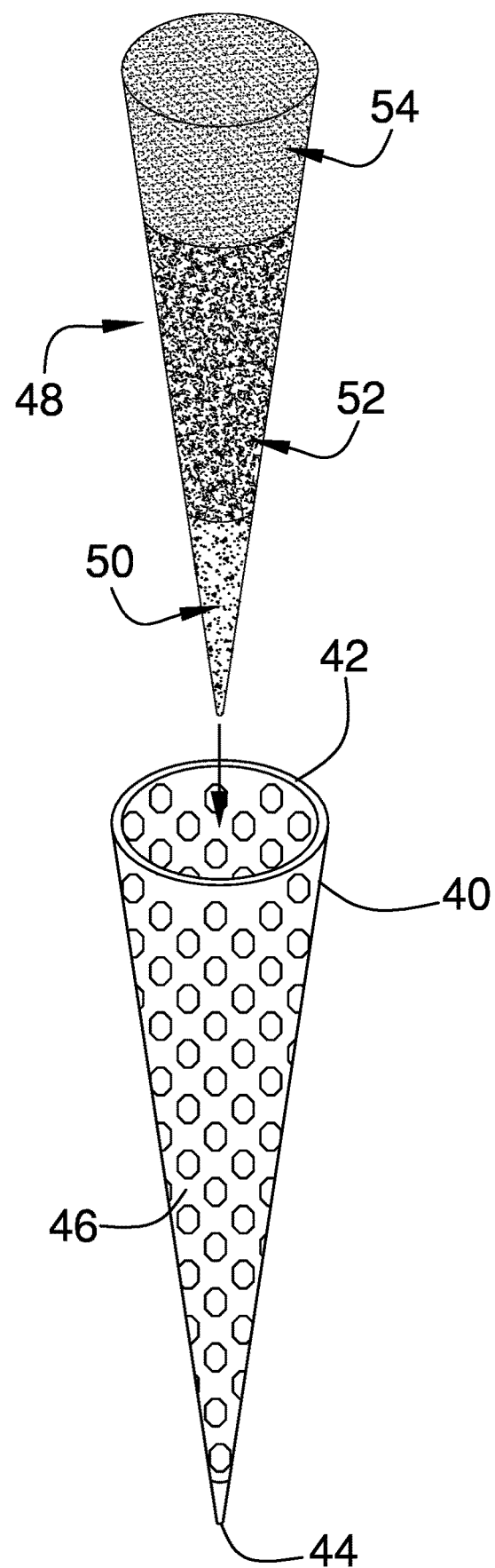
FIG. 4 is an exploded perspective view of a cone and a planting mixture of an embodiment of the disclosure.
Figure 5:
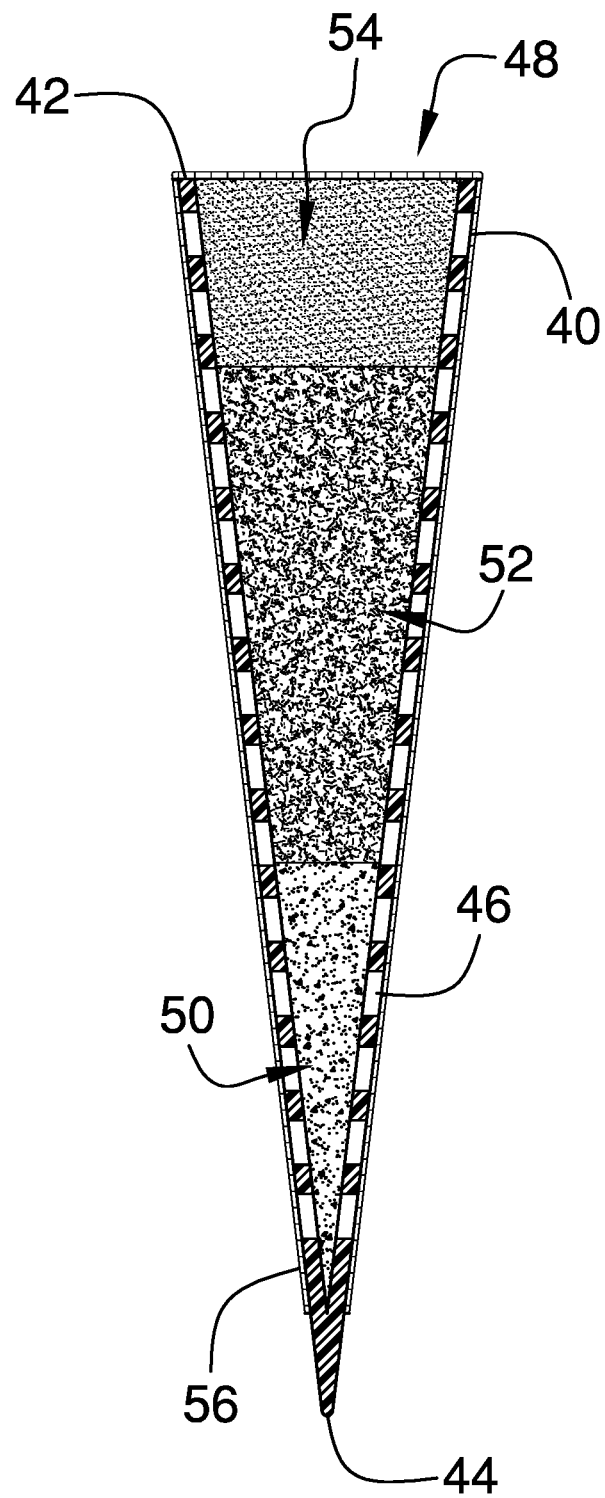
FIG. 5 is a cross sectional view taken along line 5-5 of FIG. 2 of an embodiment of the disclosure.
Figure 8:
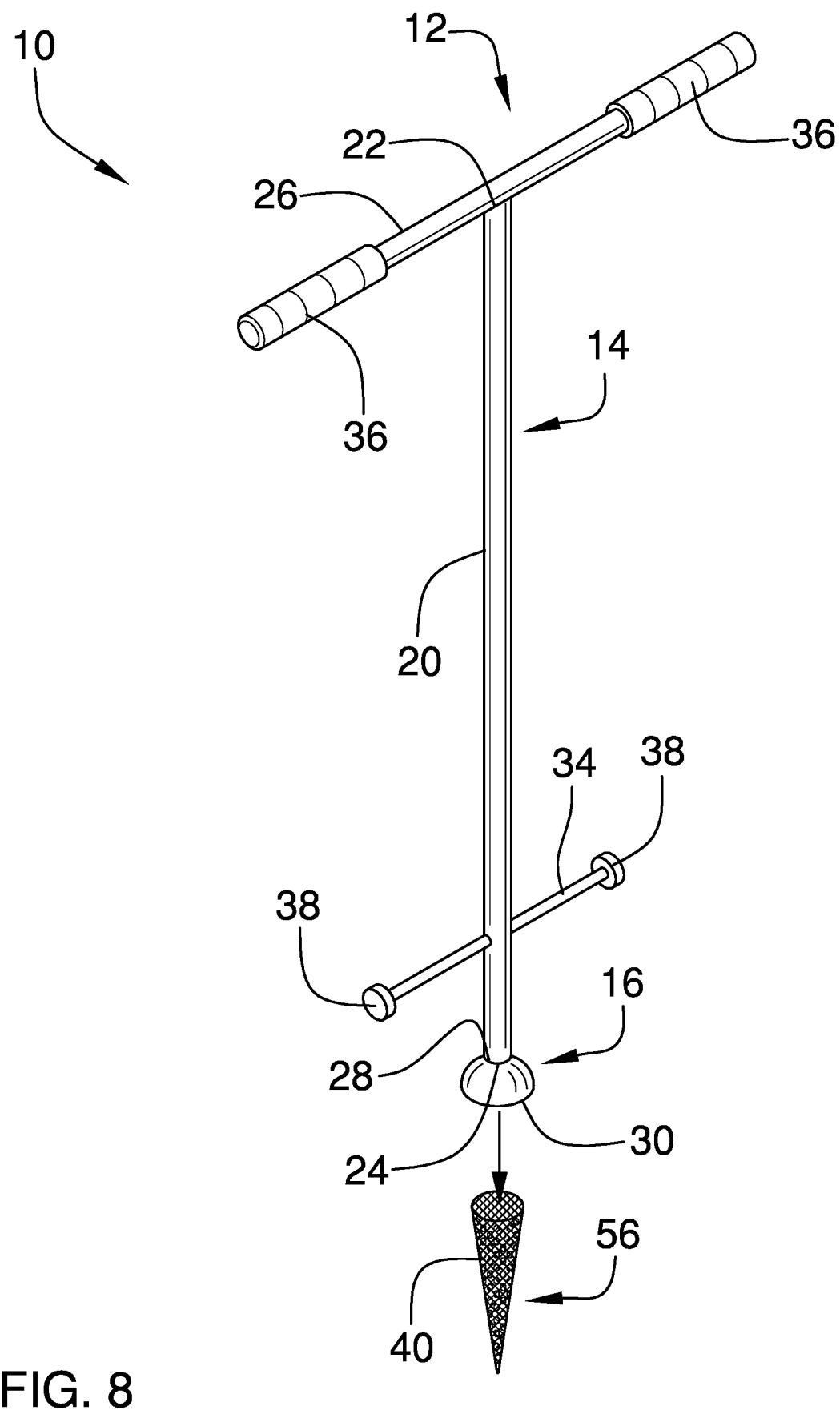
FIG. 8 is a perspective view of a grass seeding assembly according to an embodiment of the disclosure.
Figure 9:
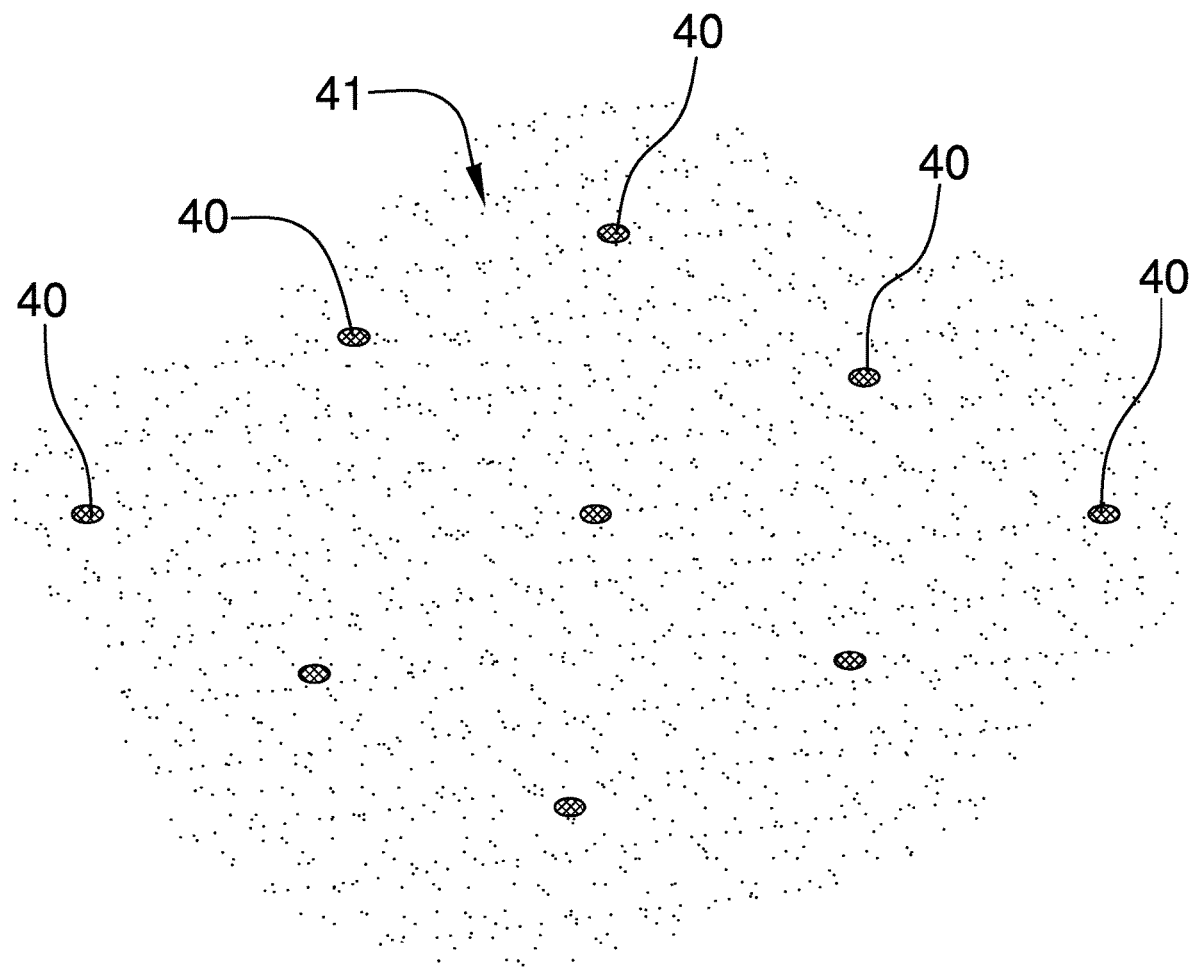
FIG. 9 is a perspective view of an embodiment of the disclosure showing a plurality of cones having been driven into the ground.

With reference now to the drawings, and in particular to FIGS. 1 through 9 thereof, a new seeding device embodying the principles and concepts of an embodiment of the disclosure and generally designated by the reference numeral 10 will be described.

As best illustrated in FIGS. 1 through 9, the grass seeding assembly 10 generally comprises an insertion tool 12 that has a handle 14 and a cup 16 disposed on the handle 14. The handle 14 comprises a first member 20 that has a top end 22 and a bottom end 24, the handle 14 comprises a second member 26 that is transversely oriented with respect to the first member 20 and the second member 26 is disposed on the top end 22 of the first member 20 thereby facilitating the second member 26 to be gripped. The cup 16 has an upper end 28 and a lower end 30, the upper end 28 is convexly arcuate with the lower end 30 and the lower end 30 has a recess 32 extending toward the upper end 28. The bottom end 24 of the first member 20 is coupled to an apex of the upper end 28.

The insertion tool 12 includes a foot peg 34 that is transversely oriented with the first member 20 thereby facilitating the foot peg 34 to be stepped upon. The foot peg 34 is positioned closer to the bottom end 24 of the first member 20 than the top end 22 of the first member 20. The second member 26 has a pair of grips 36 that is each wrapped around the second member 26. Each of the grips 36 is disposed on opposing ends of the second member 26 with respect to each other and each of the grips 36 is comprised of a resiliently compressible material for enhancing comfort of the grips 36. A pair of end caps 38 is each coupled to a respective end of the foot peg 34 to inhibit a foot from sliding off of the foot peg 34 when the foot peg 34 is stepped upon.

A cone 40 is provided and the cone 40 is engaged with the cup 16 on the insertion tool 12 thereby facilitating the cone 40 to be driven into ground 41. The cone 40 is foraminous to facilitate water to pass through the cone 40 and the cone 40 has a topmost end 42, a bottommost end 44 and an outer wall 46 extending between the topmost end 42 and the bottommost end 44. The outer wall 46 tapers to a point at the bottommost end 44, the topmost end 42 is open and the outer wall 46 is foraminous. Furthermore, the cone 40 is comprised of a biodegradable material thereby facilitating the cone 40 to dissolve in the ground 41 after a pre-determined duration of time. The outer wall 46 has a highly contrasting color adjacent to the topmost end 42 to facilitate the topmost end 42 to be visible when the cone 40 is inserted into ground 41. Additionally, the recess 32 in the lower end 30 of the cup 16 insertably receives the topmost end 42 of the cone 40 for driving the bottommost end 44 of the cone 40 into the ground 41.

A planting mixture 48 is provided and the planting mixture 48 is placed within the cone 40. the planting mixture 48 comprises a chemical fertilizer 50, grass seed 52 and soil 54. The chemical fertilizer 50 extends from the bottommost end 44 of the cone 40 toward the topmost end 42 of the cone 40, and the chemical fertilizer 50 may comprise a granular fertilizer that is commonly employed on residential lawns. The grass seed 52 extends from the chemical fertilizer 50 toward the topmost end 42 of the cone 40 and the grass seed 52 may comprise grass seed that is commonly employed on residential lawns. Furthermore, the soil 54 extends between the grass seed 52 and the topmost end 42 of the cone 40 and the soil 54 may comprise an enriched potting soil that is commonly employed in household gardening or the like.

A mesh screen 56 is wrapped around the cone 40 such that the mesh screen 56 inhibits the planting mixture 48 from passing through the cone 40. The mesh screen 56 is comprised of a fluid permeable material to facilitate water to nourish the planting mixture 48. The mesh screen 56 is wrapped around the outer wall 46 of the cone 40 and the mesh screen 56 extends from the bottommost end 44 of the cone 40 to the topmost end 42 of the cone 40. Additionally, the mesh screen 56 is comprised of a biodegradable material thereby facilitating the mesh screen 56 to decay. As is most clearly shown in FIG. 3, the mesh screen 56 may extend over the topmost end 42 of the cone 40 to inhibit the planting mixture 48 from spilling outwardly from the topmost end 42.

In use, the bottommost end 44 of the cone 40 is partially inserted into the ground 41 to facilitate the cone 40 to remain in vertical orientation and the insertion tool 12 is positioned on the cone 40 such that the recess 32 in the cup 16 receives the topmost end 42 of the cone 40. The foot peg 34 is stepped upon the drive the cone 40 into the ground 41 until the topmost end 42 of the cone 40 is level the with ground 41. In this way the chemical fertilizer 50, the grass seed 52 and the soil 54 in the cone 40 are inhibited from being washed away from rain as well as being inaccessible to animals. A plurality of the cones 40 are each driven into the ground 41 approximately 1.0 foot away from each other. In this way a lawn, for example, can be reseeded with grass without inhibiting the lawn from being mowed and otherwise maintained while the grass seed 52 in the cones 40 germinates. The lawn is watered and the cone 40 facilitates the water to pass through the cone 40 thereby facilitating optimum conditions for the grass seed 52 in the cone 40 to germinate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grass seeding assembly for planting grass seed in a desired area without the risk of runoff or poisoning of animals, said assembly comprising:

an insertion tool having a handle and a cup disposed on said handle, said handle comprising a first member having an top and a bottom end, said handle comprising a second member being transversely oriented with respect to said first member, said second member being disposed on said top end of said first member thereby facilitating said second member to be gripped, said cup having an upper and a lower end, said upper end being convexly arcuate with said lower end, said lower end having a recess extending toward said upper end, said bottom end of said first member being coupled to an apex of said upper end, said insertion tool including a foot peg being transversely oriented with said first member thereby facilitating said foot peg to be stepped upon, said foot peg being positioned closer to said bottom end of said first member than said top end of said first member, said second member having a pair of grips each being wrapped around said second member, each of said grips being disposed on opposing ends of said second member with respect to each other, each of said grips being comprised of a resiliently compressible material for enhancing comfort of said grips;

a cone being engaged with said cup on said insertion tool wherein said cone is configured to be driven into ground, said cone being foraminous wherein said cone is configured to facilitate water to pass through said cone;

a planting mixture being placed within said cone, said planting mixture comprising a chemical fertilizer, said planting mixture comprising grass seed, said planting mixture comprising soil; and a mesh screen being wrapped around said cone such that said mesh screen inhibits said planting mixture from passing through said cone whereby said mesh screen is configured to inhibit said planting mixture from being washed away and whereby said mesh screen is configured to inhibit animals from accessing said planting mixture.

2. The assembly according to claim 1, wherein said cone has a topmost end, a bottommost end and an outer wall extending between said topmost end and said bottommost end, said outer wall tapering to a point at said bottommost end, said topmost end being open, said outer wall being foraminous, said cone being comprised of a biodegradable material wherein said cone is configured to dissolve in the ground after a pre-determined duration of time, said outer wall having a highly contrasting color adjacent to said topmost end wherein said topmost end is configured to be visible when said cone is inserted into ground, said recess in said lower end of said cup insertably receiving said topmost end of said cone for driving said bottommost end of said cone into the ground.

3. The assembly according to claim 2, wherein said chemical fertilizer extends from said bottommost end of said cone toward said topmost end of said cone, said grass seed extending from said chemical fertilizer toward said topmost end of said cone, said soil extending between said grass seed and said topmost end of said cone.

4. The assembly according to claim 2, wherein said mesh screen is comprised of a fluid permeable material wherein said mesh screen is configured to facilitate water to nourish said planting mixture, said mesh screen being wrapped around said outer wall of said cone, said mesh screen extending from said bottommost end of said cone to said topmost end of said cone.

5. A grass seeding assembly for planting grass seed in a desired area without the risk of runoff or poisoning of animals, said assembly comprising:

an insertion tool having a handle and a cup disposed on said handle, said handle comprising a first member having an top and a bottom end, said handle comprising a second member being transversely oriented with respect to said first member, said second member being disposed on said top end of said first member thereby facilitating said second member to be gripped, said cup having an upper and a lower end, said upper end being convexly arcuate with said lower end, said lower end having a recess extending toward said upper end, said bottom end of said first member being coupled to an apex of said upper end, said insertion tool including a foot peg being transversely oriented with said first member thereby facilitating said foot peg to be stepped upon, said foot peg being positioned closer to said bottom end of said first member than said top end of said first member, said second member having a pair of grips each being wrapped around said second member, each of said grips being disposed on opposing ends of said second member with respect to each other, each of said grips being comprised of a resiliently compressible material for enhancing comfort of said grips;

a cone being engaged with said cup on said insertion tool wherein said cone is configured to be driven into ground, said cone being foraminous wherein said cone is configured to facilitate water to pass through said cone, said cone having a topmost end, a bottommost end and an outer wall extending between said topmost end and said bottommost end, said outer wall tapering to a point at said bottommost end, said topmost end being open, said outer wall being foraminous, said cone being comprised of a biodegradable material wherein said cone is configured to dissolve in the ground after a pre-determined duration of time, said outer wall having a highly contrasting color adjacent to said topmost end wherein said topmost end is configured to be visible when said cone is inserted into ground, said recess in said lower end of said cup insertably receiving said topmost end of said cone for driving said bottommost end of said cone into the ground;

a planting mixture being place within said cone, said planting mixture comprising a chemical fertilizer, said planting mixture comprising grass seed, said planting mixture comprising soil, said chemical fertilizer extending from said bottommost end of said cone toward said topmost end of said cone, said grass seed extending from said chemical fertilizer toward said topmost end of said cone, said soil extending between said grass seed and said topmost end of said cone; and a mesh screen being wrapped around said cone such that said mesh screen inhibits said planting mixture from passing through said cone whereby said mesh screen is configured to inhibit said planting mixture from being washed away and whereby said mesh screen is configured to inhibit animals from accessing said planting mixture, said mesh screen being comprised of a fluid permeable material wherein said mesh screen is configured to facilitate water to nourish said planting mixture, said mesh screen being wrapped around said outer wall of said cone, said mesh screen extending from said bottommost end of said cone to said topmost end of said cone.

* * * * *